(12) United States Patent
Shaffer

(10) Patent No.: US 9,998,568 B2
(45) Date of Patent: Jun. 12, 2018

(54) METHOD AND DEVICE FOR INTERNET PROTOCOL COMMUNICATION OVER A DMX NETWORK

(71) Applicant: PHILIPS LIGHTING HOLDING B.V., Eindhoven (NL)

(72) Inventor: Maximillan Ben Shaffer, Arlington, MA (US)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 154 days.

(21) Appl. No.: 14/916,630

(22) PCT Filed: Aug. 21, 2014

(86) PCT No.: PCT/IB2014/063999
§ 371 (c)(1),
(2) Date: Mar. 4, 2016

(87) PCT Pub. No.: WO2015/033245
PCT Pub. Date: Mar. 12, 2015

(65) Prior Publication Data
US 2016/0205222 A1    Jul. 14, 2016

Related U.S. Application Data

(60) Provisional application No. 61/873,406, filed on Sep. 4, 2013.

(51) Int. Cl.
*G06F 15/16* (2006.01)
*H04L 29/06* (2006.01)
(Continued)

(52) U.S. Cl.
CPC ............ *H04L 69/08* (2013.01); *H04L 67/12* (2013.01); *H04L 69/16* (2013.01); *H05B 37/0254* (2013.01)

(58) Field of Classification Search
CPC ......... H04L 69/08; H04L 69/16; H04L 67/12; H05B 37/0254
See application file for complete search history.

(56) References Cited

U.S. PATENT DOCUMENTS 4,947,302 A  *  8/1990  Callahan .............. H05B 37/029
                                                            315/312
6,016,038 A       1/2000  Mueller et al.
(Continued)

FOREIGN PATENT DOCUMENTS

CN     101699923 A     4/2010
WO     2013050954 A1   4/2013

OTHER PUBLICATIONS http://www.uwosh.edu/faculty_staff/alderson/lighting/dmx512.htm, "DMX-512, Dimmer Protocol: An Intro DO DMX-512," Last Visited on Mar. 1, 2016 (3 Pages).
(Continued)

*Primary Examiner* — Krisna Lim
(74) *Attorney, Agent, or Firm* — Meenakshy Chakravorty

(57) ABSTRACT

A device includes a transceiver configured to communicate over a communication network according to Digital Multiplex (DMX) protocol; a memory device; and a microcontroller configured to process server data stored in the memory device into one or more Internet Protocol packets and to provide the one or more Internet Protocol packets to the transceiver for communication of the server data over the communication network according to the DMX protocol.

18 Claims, 8 Drawing Sheets

(51) Int. Cl.
    *H05B 37/02*     (2006.01)
    *H04L 29/08*     (2006.01)

(56) References Cited

U.S. PATENT DOCUMENTS

| | | |
|---|---|---|
| 6,175,771 B1 | 1/2001 | Hunt et al. |
| 6,211,626 B1 | 4/2001 | Lys et al. |
| 8,938,468 B2 * | 1/2015 | Morgan ............... H05B 37/029 |
| | | 362/544 |
| 9,378,086 B2 * | 6/2016 | Mills ................. H05B 37/0254 |
| 9,378,087 B2 * | 6/2016 | Yseboodt ........... H05B 37/0245 |
| 2006/0125426 A1 | 6/2006 | Veskovic et al. |
| 2011/0115413 A1 | 5/2011 | Erickson et al. |
| 2011/0138263 A1 | 6/2011 | Sims et al. |
| 2011/0239056 A1 | 9/2011 | Adams |
| 2014/0245112 A1 * | 8/2014 | Mills ................. H05B 37/0254 |
| | | 714/776 |

OTHER PUBLICATIONS

Arkanz, "DMX USB Interface & DMX IP Interface, Software Manual—Easy Stand Alone," Apr. 2013 (21 Pages).
No Author Listed, "Easy Stand Alone 2008," 20009 (40 Pages).
Kim, Youjin, et al., "Analysis of IP-Based Control Networks for LED Lighting Fixture Communication," Apr. 2013 (6 Pages).
Wang, Huifen, et al., "Research on Landscape Lighting System Based on DMX512," 7th IEEE International Conference on Industrial Informatics (INDIN209), 2009 (6 Pages).

* cited by examiner

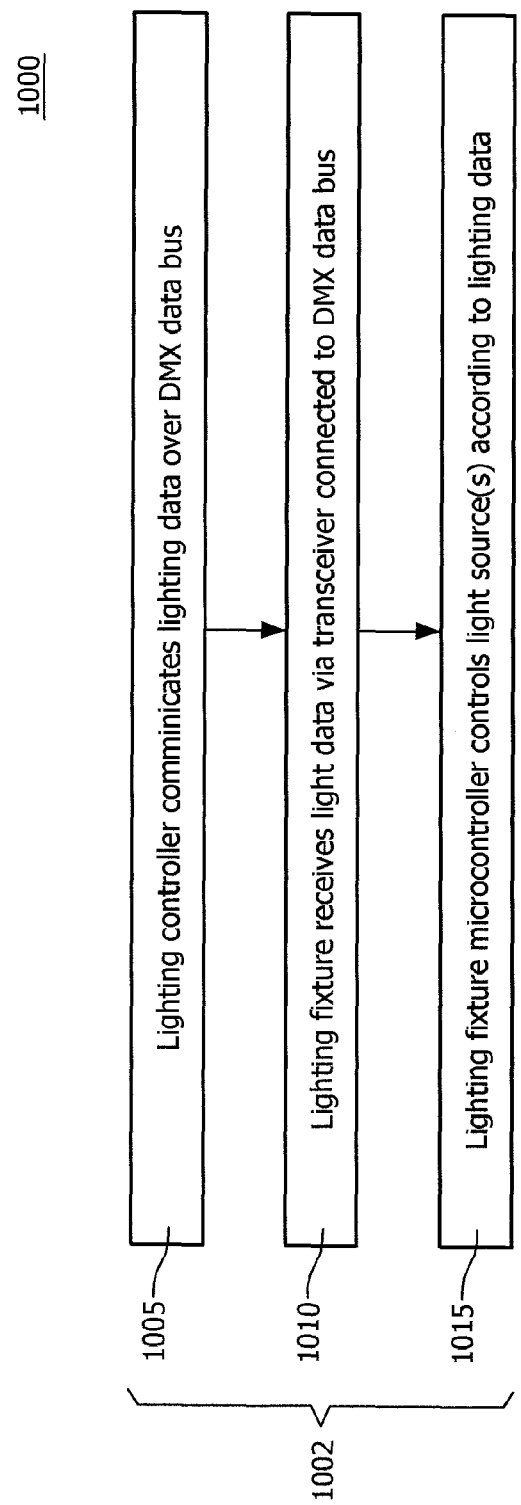

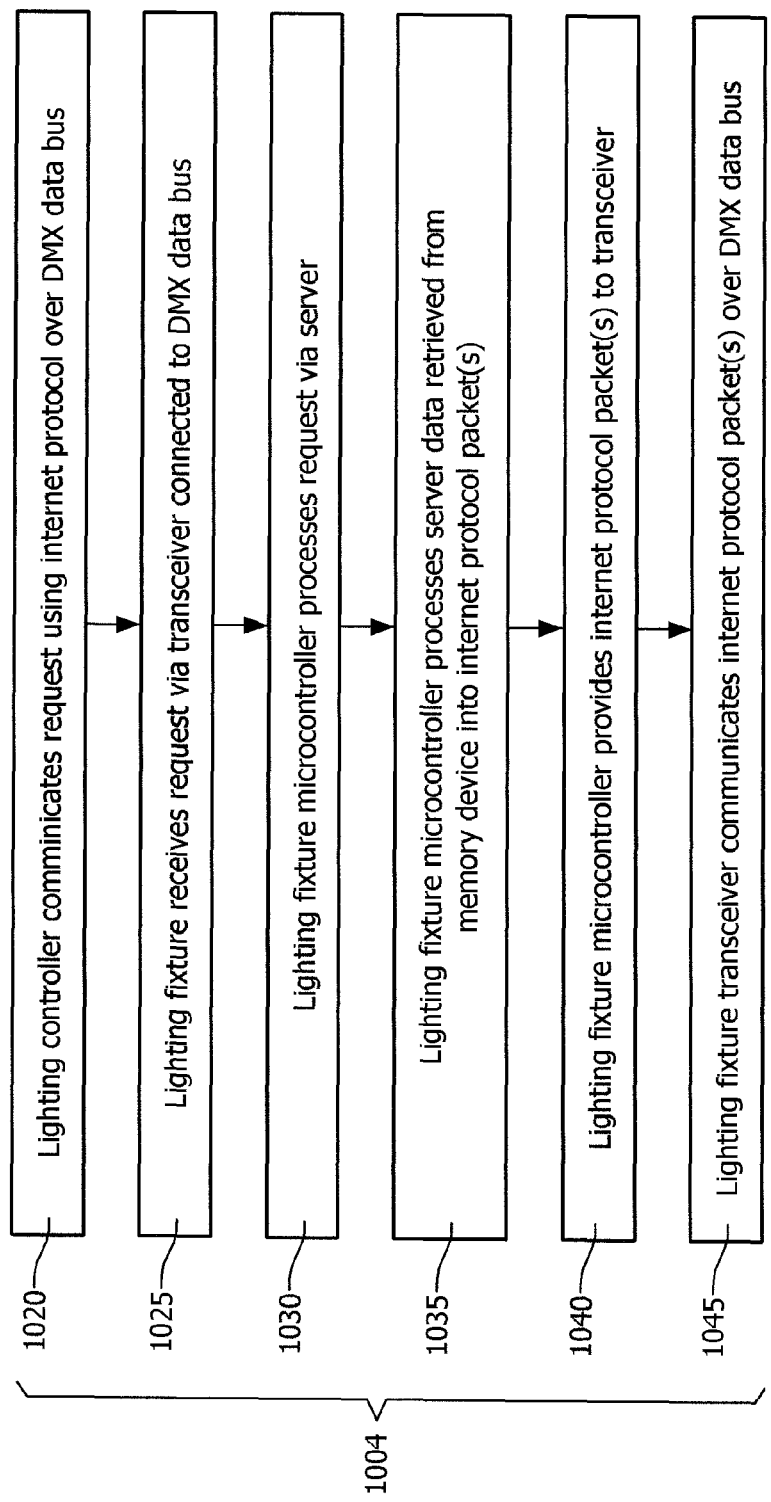
FIG. 10 (continue)

METHOD AND DEVICE FOR INTERNET PROTOCOL COMMUNICATION OVER A DMX NETWORK

CROSS-REFERENCE TO PRIOR APPLICATIONS

This application is the U.S. National Phase application under 35 U.S.C. § 371 of International Application No. PCT/IB2014/063999, filed on Aug. 21, 2014, which claims the benefit of U.S. Provisional Patent Application No. 61/873,406, filed on Sep. 4, 2013. These applications are hereby incorporated by reference herein.

TECHNICAL FIELD

The present invention is directed generally to devices and systems which employ a Digital MultipleX (DMX) compliant communication network. More particularly, various inventive methods and apparatus disclosed herein relate to methods and devices for using the DMX communication protocol to communicate Internet protocol traffic over a DMX network.

BACKGROUND

Digital lighting technologies, e.g. illumination based on semiconductor light sources, such as light-emitting diodes (LEDs), offer a viable alternative to traditional fluorescent, HID, and incandescent lamps. Functional advantages and benefits of LEDs include high energy conversion and optical efficiency, durability, lower operating costs, and many others. Recent advances in LED technology have provided efficient and robust full-spectrum lighting sources that enable a variety of lighting effects in many applications. Some of the fixtures embodying these sources feature a lighting module, including one or more LEDs capable of producing different colors, e.g. red, green, and blue, as well as a processor for independently controlling the output of the LEDs in order to generate a variety of colors and color-changing lighting effects, for example, as discussed in detail in U.S. Pat. Nos. 6,016,038 and 6,211,626, incorporated herein by reference.

The Digital Multiplex (DMX) communication protocol is a communication protocol used widely in digital lighting networks. The DMX hardware specification defines RS-485 as the physical interface, and frame break as the start of frame (SOF) indicator. The DMX protocol contains few constraints, but defines a frame size of 512 data bytes (maximum) preceded by a one-byte start code. Other than the start code, the DMX frame content may be specified by the application designer. DMX may be used to send binary data to lighting fixtures, which may include show content and device configuration/settings.

It would be desirable to be able to take advantage of the flexibility of the DMX protocol, and DMX devices connected in a communication network which employs the DMX protocol, to support a broader and more flexible set of communication options.

SUMMARY

The present disclosure is directed to inventive methods and apparatus for communication over a DMX network. For example, the present disclosure relates to a method and devices for Internet Protocol communication over a DMX network.

Generally, in one aspect, the invention relates to a device that includes: a transceiver configured to communicate over a communication network according to Digital MultipleX (DMX) protocol; a memory device; and a microcontroller configured to process server data stored in the memory device into one or more Internet Protocol packets and to provide the one or more Internet Protocol packets to the transceiver for communication of the server data over the communication network according to the DMX protocol.

In one or more embodiments, the device may include one or more light sources, wherein the light sources are controlled by the microcontroller in response to lighting control data received by the device over the communication network according to the DMX protocol.

In one or more embodiments, the transceiver may be an RS-485 transceiver.

In one or more embodiments, the microcontroller may be configured to generate a header for each of the Internet Protocol packets, the header including product identification code for device, a serial number for the device, a user datagram protocol (UDP) source port, a UDP destination port, a length of the Internet Protocol packet, a checksum, and the server data. In one or more versions of these embodiments, the microcontroller may be further configured to parse an Internet Protocol packet received by the transceiver from an Internet Protocol client device over the communication network according to the DMX protocol to determine client data included in the Internet Protocol packet. In yet other versions of these embodiments, the client data may be formatted as ASCII text with one byte per ASCII character. Also, in some versions of these embodiments, the client data may include a request for the server data, the request complying with one of a JavaScript Object Notation (JSON) data interchange format and an eXtensible Mark-up Language (XML) data interchange format.

In one or more embodiments, the microcontroller may be configured to provide at least one of a Hyper-Text Transfer Protocol (HTTP) server, a File Transfer Protocol (FTP) server, and a Secure Shell (SSH) server, and to communicate via the transceiver with a client connected to the communication network, according to the DMX protocol.

In one or more embodiments, the one or more Internet Protocol packets may be interleaved on the communication network with DMX packets which communicate lighting control data from a lighting controller to the device.

In another aspect, the invention relates to a method that includes processing server data retrieved from a memory device into one or more Internet Protocol packets; providing the one or more Internet Protocol packets to a transceiver; and communicating the one or more Internet Protocol packets from the transceiver over a communication network according to Digital MultipleX (DMX) protocol.

In one or more embodiments, the microcontroller may receive from the transceiver lighting control data communicated over the communication network according to the DMX protocol, and may control illumination of one or more light sources according to the lighting control data.

In one or more embodiments, the microcontroller may generate a header for each of the Internet Protocol packets, the header including a product identification code for a device which includes the microcontroller, a serial number for the device which includes the microcontroller, a user datagram protocol (UDP) source port, a UDP destination port, a length of the Internet Protocol packet, a checksum, and the server data.

In one or more embodiments, the microcontroller may parse an Internet Protocol packet received by the transceiver from an Internet Protocol client device over the communication network according to the DMX protocol to determine client data included in the Internet Protocol packet.

In one or more versions of these embodiments, the client data may be formatted as ASCII text with one byte per ASCII character.

In one or more versions of these embodiments, the client data may include a request for the server data, the request complying with one of a JSON data interchange format and an XML data interchange format.

In one or more embodiments, the microcontroller may provide at least one of an HTTP server, an FTP server, and an SSH server, and communicating via the transceiver with a client connected to the communication network, according to the DMX protocol.

In yet another embodiment, a network includes a Digital MultipleX (DMX) data bus; a lighting controller connected to the DMX data bus; and at least one lighting fixture connected to the DMX bus. The lighting fixture comprises: a transceiver configured to communicate over the DMX bus; one or more light sources, a memory device, and a microcontroller configured to control illumination by the one or more light sources in response to lighting control data received from the lighting controller over the DMX data bus, and further configured to process server data stored in the memory device into one or more Internet Protocol packets and to provide the one or more Internet Protocol packets to the transceiver for communication of the server data to the lighting controller over the DMX data bus. In one or more embodiments, the lighting controller may comprise: a lighting controller transceiver configured to communicate over the DMX bus; and a microcontroller configured to provide one or more Internet Protocol packets to the lighting controller for communication to the at least one lighting fixture over the DMX data bus.

In one or more embodiments, the transceiver may be an RS-485 transceiver.

In one or more embodiments, the microcontroller may be configured to generate a header for each of the Internet Protocol packets, the header including a product identification code for lighting fixture, a serial number for the lighting fixture, a user datagram protocol (UDP) source port, a UDP destination port, a length of the Internet Protocol packet, a checksum, and the server data.

In one or more embodiments, the microcontroller may be configured to provide at least one of an HTTP server, an FTP server, and an SSH server which is configured to supply the server data to the lighting controller in response to a request received from the lighting controller via an Internet Protocol packet over the DMX data bus.

As used herein for purposes of the present disclosure, the term "LED" should be understood to include any electroluminescent diode or other type of carrier injection/junction-based system that is capable of generating radiation in response to an electric signal. Thus, the term LED includes, but is not limited to, various semiconductor-based structures that emit light in response to current, light emitting polymers, organic light emitting diodes (OLEDs), electroluminescent strips, and the like. For example, one implementation of an LED configured to generate essentially white light (e.g., a white LED) may include a number of dies which respectively emit different spectra of electroluminescence that, in combination, mix to form essentially white light. In another implementation, a white light LED may be associated with a phosphor material that converts electroluminescence having a first spectrum to a different second spectrum. In one example of this implementation, electroluminescence having a relatively short wavelength and narrow bandwidth spectrum "pumps" the phosphor material, which in turn radiates longer wavelength radiation having a somewhat broader spectrum. It should also be understood that the term LED does not limit the physical and/or electrical package type of an LED. For example, as discussed above, an LED may refer to a single light emitting device having multiple dies that are configured to respectively emit different spectra of radiation (e.g., that may or may not be individually controllable). Also, an LED may be associated with a phosphor that is considered as an integral part of the LED (e.g., some types of white LEDs).

The term "light source" should be understood to refer to any one or more of a variety of radiation sources, including, but not limited to, LED-based sources (including one or more LEDs as defined above), incandescent sources (e.g., filament lamps, halogen lamps), fluorescent sources, phosphorescent sources, high-intensity discharge sources (e.g., sodium vapor, mercury vapor, and metal halide lamps), lasers, and other types of electroluminescent sources, A given light source may be configured to generate electromagnetic radiation within the visible spectrum, outside the visible spectrum, or a combination of both. Hence, the terms "light" and "radiation" are used interchangeably herein. Additionally, a light source may include as an integral component one or more filters (e.g., color filters), lenses, or other optical components. Also, it should be understood that light sources may be configured for a variety of applications, including, but not limited to, indication, display, and/or illumination. An "illumination source" is a light source that is particularly configured to generate radiation having a sufficient intensity to effectively illuminate an interior or exterior space. In this context, "sufficient intensity" refers to sufficient radiant power in the visible spectrum generated in the space or environment (the unit "lumens" often is employed to represent the total light output from a light source in all directions, in terms of radiant power or "luminous flux") to provide ambient illumination (i.e., light that may be perceived indirectly and that may be, for example, reflected off of one or more of a variety of intervening surfaces before being perceived in whole or in part).

The term "spectrum" should be understood to refer to any one or more frequencies (or wavelengths) of radiation produced by one or more light sources. Accordingly, the term "spectrum" refers to frequencies (or wavelengths) not only in the visible range, but also frequencies (or wavelengths) in the infrared, ultraviolet, and other areas of the overall electromagnetic spectrum. Also, a given spectrum may have a relatively narrow bandwidth (e.g., a FWHM having essentially few frequency or wavelength components) or a relatively wide bandwidth (several frequency or wavelength components having various relative strengths). It should also be appreciated that a given spectrum may be the result of a mixing of two or more other spectra (e.g., mixing radiation respectively emitted from multiple light sources).

The term "lighting fixture" is used herein to refer to an implementation or arrangement of one or more lighting units in a particular form factor, assembly, or package. The term "lighting unit" is used herein to refer to an apparatus including one or more light sources of same or different types. A given lighting unit may have any one of a variety of mounting arrangements for the light source(s), enclosure/housing arrangements and shapes, and/or electrical and mechanical connection configurations. Additionally, a given lighting unit optionally may be associated with (e.g., include, be coupled to and/or packaged together with) various other components (e.g., control circuitry) relating to the operation of the light source(s). An "LED-based lighting unit" refers to a lighting unit that includes one or more LED-based light sources as discussed above, alone or in combination with other non LED-based light sources. A "multi-channel" lighting unit refers to an LED-based or non LED-based lighting unit that includes at least two light sources configured to respectively generate different spectrums of radiation, wherein each different source spectrum may be referred to as a "channel" of the multi-channel lighting unit.

The term "controller" is used herein generally to describe various apparatus relating to the operation of one or more light sources. A controller can be implemented in numerous ways (e.g., such as with dedicated hardware) to perform various functions discussed herein. A "microcontroller" is one example of a controller. A "processor" is one example of a controller, or microcontroller, which employs one or more microprocessors that may be programmed using software (e.g., microcode) to perform various functions discussed herein. A controller may be implemented with or without employing a processor, and also may be implemented as a combination of dedicated hardware to perform some functions and a processor (e.g., one or more programmed microprocessors and associated circuitry) to perform other functions. Examples of controller components that may be employed in various embodiments of the present disclosure include, but are not limited to, conventional microprocessors, application specific integrated circuits (ASICs), and field-programmable gate arrays (FPGAs).

In various implementations, a processor or controller may be associated with one or more storage media (generically referred to herein as "memory," e.g., volatile and non-volatile computer memory such as RAM, PROM, EPROM, and EEPROM, floppy disks, compact disks, optical disks, magnetic tape, etc.). In some implementations, the storage media may be encoded with one or more programs that, when executed on one or more processors and/or controllers, perform at least some of the functions discussed herein. Various storage media may be fixed within a processor or controller or may be transportable, such that the one or more programs stored thereon can be loaded into a processor or controller so as to implement various aspects of the present invention discussed herein. The terms "program" or "computer program" are used herein in a generic sense to refer to any type of computer code (e.g., software or microcode) that can be employed to program one or more processors or controllers.

The term "addressable" is used herein to refer to a device (e.g., a light source in general, a lighting unit or fixture, a controller or processor associated with one or more light sources or lighting units, other non-lighting related devices, etc.) that is configured to receive information (e.g., data) intended for multiple devices, including itself, and to selectively respond to particular information intended for it. The term "addressable" often is used in connection with a networked environment (or a "network," discussed further below), in which multiple devices are coupled together via some communications medium or media.

In one network implementation, one or more devices coupled to a network may serve as a controller for one or more other devices coupled to the network (e.g., in a master/slave relationship). In another implementation, a networked environment may include one or more dedicated controllers that are configured to control one or more of the devices coupled to the network. Generally, multiple devices coupled to the network each may have access to data that is present on the communications medium or media; however, a given device may be "addressable" in that it is configured to selectively exchange data with (i.e., receive data from and/or transmit data to) the network, based, for example, on one or more particular identifiers (e.g., "addresses") assigned to it.

The term "network" as used herein refers to any interconnection of two or more devices (including controllers or processors) that facilitates the transport of information (e.g. for device control, data storage, data exchange, etc.) between any two or more devices and/or among multiple devices coupled to the network. As should be readily appreciated, various implementations of networks suitable for interconnecting multiple devices may include any of a variety of network topologies and employ any of a variety of communication protocols. Additionally, in various networks according to the present disclosure, any one connection between two devices may represent a dedicated connection between the two systems, or alternatively a non-dedicated connection. In addition to carrying information intended for the two devices, such a non-dedicated connection may carry information not necessarily intended for either of the two devices (e.g., an open network connection). Furthermore, it should be readily appreciated that various networks of devices as discussed herein may employ one or more wireless, wire/cable, and/or fiber optic links to facilitate information transport throughout the network.

The term "user interface" as used herein refers to an interface between a human user or operator and one or more devices that enables communication between the user and the device(s). Examples of user interfaces that may be employed in various implementations of the present disclosure include, but are not limited to, switches, potentiometers, buttons, dials, sliders, a mouse, keyboard, keypad, various types of game controllers (e.g., joysticks), track balls, display screens, various types of graphical user interfaces (GUIs), touch screens, microphones and other types of sensors that may receive some form of human-generated stimulus and generate a signal in response thereto.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention.

FIG. 10 is a flowchart illustrating one example embodiment of a method of Internet Protocol communication over a DMX network.

DETAILED DESCRIPTION

Generally, Applicant has recognized and appreciated that it would be beneficial to take advantage of the flexibility of the Digital MultipleX (DMX) protocol, and DMX devices connected in a network which employs the DMX protocol, to support a broader and more flexible set of communication options. In view of the foregoing, various embodiments and implementations of the present invention are directed to a method and devices for Internet Protocol communication over a DMX network.

Figure 1:
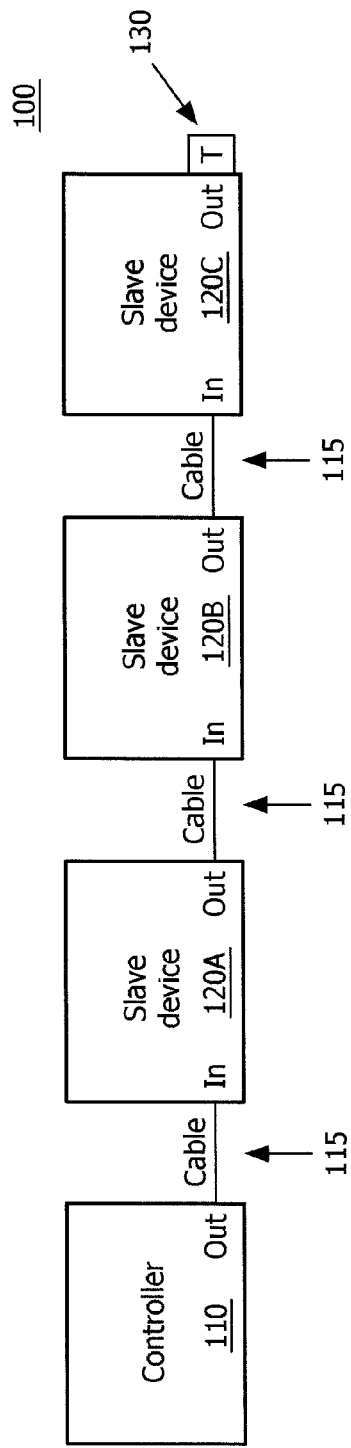
FIG. 1 illustrates an example of a Digital MultipleX (DMX) network.

FIG. 1 illustrates an example of a Digital MultipleX (DMX) network 100. DMX network includes a controller 110 connected to, and capable of digital communication with, slave devices 120 (e.g., slave devices 12A, 120B and 120C) via a cable implementing a DMX data bus 115.

In some embodiments, the cable carries an RS-485 standard differential signal. In various embodiments, DMX data bus 115 may operate in full duplex or half duplex mode.

Figure 2:
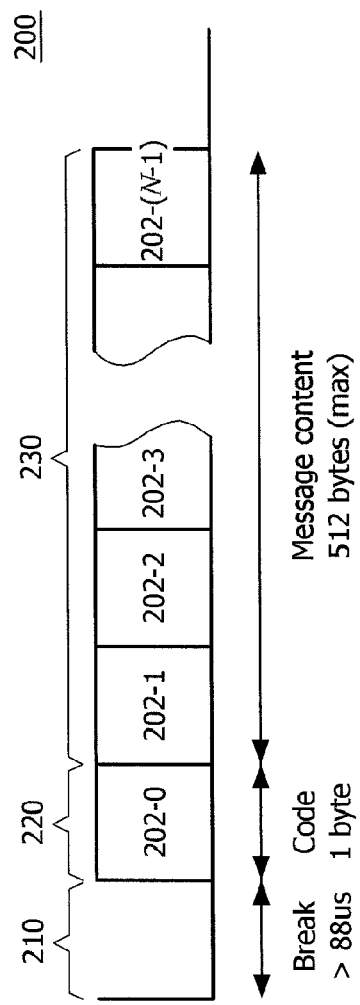
FIG. 2 illustrates an example of a DMX packet.

FIG. 2 illustrates an example of a DMX packet or frame 200 (hereinafter referred to as a DMX frame) which may be communicated via DMX network 100.

DMX frame 200 includes an initial frame break 210 followed by N slots 202-0, 202-1, 202-2 . . . 202-(N−1). Initial slot 202-0 (slot 0) includes a start code 220, and slots 202-1 through 202-(N−1) contain message content or data 230.

Frame break 210 serves as a start of frame (SOF) indicator and is signified by a break of at least 88 µs, followed by a "mark" (a logical one) of at least 8 µs, known as the "Mark After Break" (MAB). Frame break 210, which signals the end of one packet and the start of another, causes receivers to start reception and also serves as a frame (position reference) for data bytes within the packet.

As noted above, start code 220 appears in initial slot 202-0 (slot 0). Start code 220 specifies the type of data which is included in the DMX frame 210. A start code of 0x00 (hexadecimal zero) is a standard value which may be used for transmitting lighting control data for lighting fixtures and dimmers. Other start codes are used for text packets (0x17), System Information Packets (0xCF), etc.

The DMX hardware specification defines RS-485 (aka EIA-485) as the standard for the physical interface.

Table 1 lists some data link layer parameters of the DMX protocol.

TABLE 1

| | |
|---|---|
| START BITS | 1 |
| STOP BITS | 2 |
| PARITY BITS | 0 |
| DATA BITS | 8 |
| BAUD RATE | 250 kbps |

As illustrated in FIG. 1, each DMX frame 200 communicates one 11-bit byte in each slot 202. Each 11-bit byte includes one start bit, eight data bits, two stop bits and no parity.

Figure 3:
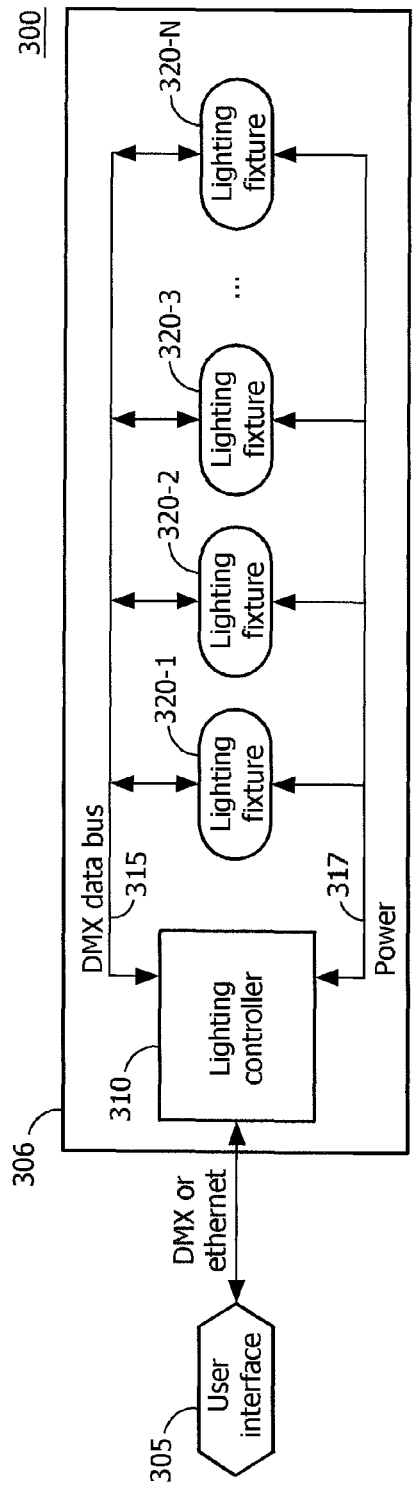
FIG. 3 illustrates an example embodiment of an architecture of a lighting system which employs the DMX protocol.

FIG. 3 illustrates an example embodiment of an architecture of a lighting system 300 which employs the DMX protocol.

Lighting system 300 includes a user interface 305 and a lighting network 306. Lighting network 306 includes a lighting controller 310 connected to, and in communication with, a plurality of lighting fixtures 320—e.g., lighting fixtures 320-1, 320-2, 320-3 . . . 320-N, via a DMX data bus 315. In lighting system 300, lighting controller 310 and lighting fixtures 320 also receive electrical power via a power bus 317. However, in other embodiments various ones of the lighting controller 310 and lighting fixtures 320 may receive electrical power via a separate power connection or connections.

Lighting network 306 may be one embodiment of DMX network 100.

Each of lighting fixtures 320 may have an address such that lighting controller 310 may individually address DMX frames 310 to corresponding lighting fixtures 320. In some embodiments, one or more lighting fixtures 320 may share the same address so as to be addressed or controlled together.

Each of lighting fixtures 320 may include one or more light sources, for example one or more LED-based light sources, whose illumination may be controlled in response to lighting control data communicated from lighting controller 310 via DMX frames (e.g., DMX frames 200) over DMX data bus 315. For example, the lighting intensity (or dimming level), color, saturation level, color temperature, on/off pattern, etc. of each lighting fixture 320 may be controlled in response to lighting control data communicated from lighting controller 310 via DMX frames (e.g., DMX frames 200) over DMX data bus 315.

User interface 305 may be connected to, and in communication with, lighting controller 310, for example via a DMX data bus or an Ethernet connection. In some embodiments, user interface 305 may provide means for a user to set one or more illumination parameters for one or more of lighting fixtures 320.

Figure 4:
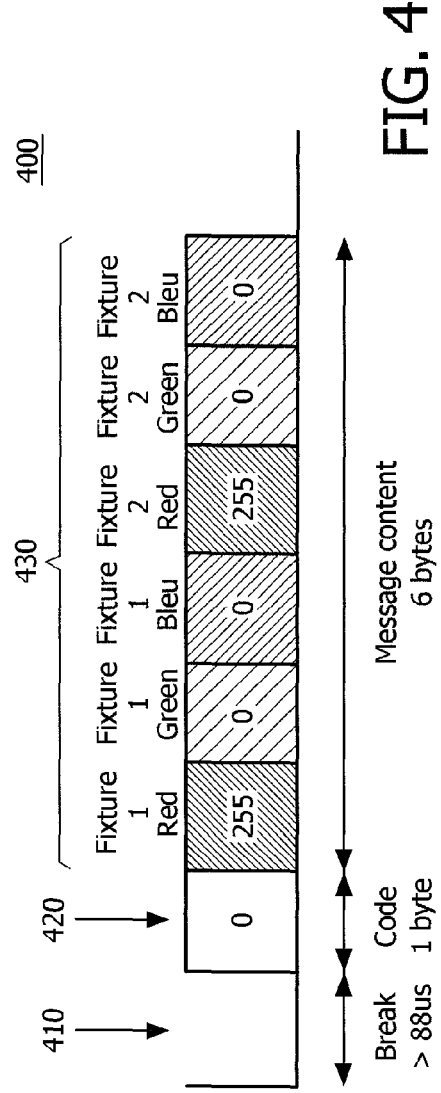
FIG. 4 illustrates an example embodiment of a DMX frame which may be transmitted in the lighting system of FIG. 3.

FIG. 4 illustrates an example embodiment of a DMX frame 400 which may be transmitted in the lighting system 300 of FIG. 3. DMX frame 400 includes initial frame break 410 followed by DMX start code 420 in slot 0, and message content or data 430, only the first six slots or bytes of which are illustrated in FIG. 4.

In the example embodiment, DMX start code 420 is '0', corresponding to show content. For an RGB lighting fixture 320 which has three colors each with 8 bits of intensity resolution, the first three bytes after DMX start code 420 control the intensity of the red, green, and blue channels respectively. The first RGB triplet will control lighting fixtures 430 with DMX address 1. The next RGB triplet will control lighting fixtures 430 with DMX address 4, etc.

Because the baud rate and maximum packet size are defined by the DMX protocol specification, a maximum frame rate is implied.

The maximum transmission duration, transmission_duration (max)=1/((513 words/frame)*(11 bits/word)/(250 kbps)+88 us break)=22.66 ms/frame.

The maimum frame rate, frame_rate (max)=1/transmission_duration (max)=44.1 fps.

Higher frame rates can be achieved by reducing the packet size. However, in some lighting systems, lighting controllers send data at 40 fps (max). A frame rate of 40 fps implies that a frame is transmitted every 25 ms, which means that the DMX data bus is actually idle for 2.34 ms/frame (i.e. 25 ms−22.66 ms). The free bus bandwidth can be utilized for transmitting additional messages, for example using an Internet Protocol.

The available bandwidth for these additional messages, free_bus_bandwidth=(2.34 ms−88 us)*250 kbps/(11 bits/word)=51 words.

It is generally true that momentary dips in frame rate are not visible to casual observers as long as the frame rate variation stays within certain bounds. For example, an observer probably will not notice a decrease in frame rate from 40 fps to 30 fps over a short amount of time. Frames can occasionally even be dropped completely without being noticed. All of this information points to the fact that the DMX data bus can support more traffic if the bus bandwidth is managed carefully.

Internet Protocol can be broken down into four layers as shown in Table 2.

TABLE 2

| | |
|---|---|
| Application Layer | HTTP, SSH, FTP, etc |
| Transport Layer | TCP, UDP, etc |
| Internet Layer | IPv4, IPv6, etc |
| Link Layer | Ethernet (generally) |

In brief, the application layer is the part of the protocol used by the web client and web server to exchange data. The data and format of this layer is fairly flexible and can be determined by the specific application in which it is used. The data may be ASCII or binary encoded and may or may not be encrypted.

The transport layer contains a binary header which describes the Application Layer data. The transport layer header may include the data length and/or provide a checksum of the application data.

The Internet layer is used for inter-networking, that is to say, when networks are connected to each other.

The link layer is the physical (i.e. hardware) layer used to transport data to and from their destinations.

Off-the-shelf web server code might not be compatible with the limited processing and memory resources available with a low-cost microcontroller which might be used for a DMX device. For this reason, it is desirable to provide web service components which support a selective subset of the standard web protocols. In some embodiments, one or more of HyperText Transfer Protocol (HTTP), File Transfer Protocol (FTP), and Secure Shell (SSH) services may be supported. In some embodiments, the JSON data interchange format may be employed as the file format for HTTP resource files. In some embodiments, the XML data interchange format may be employed. Other data exchange formats may be employed.

In some embodiments, the lighting controller may be the only "client" on a network of light fixture "servers." In that case, the concept of retaining state or connection is not required. Accordingly, in these embodiments, the Internet layer of the protocol stack illustrated in Table 2 is unnecessary and can be removed. Removing the Internet layer allows the web server to be more efficient and use fewer processor resources. This can be beneficial when the web server is embedded in a lighting fixture, such as lighting fixture 320 of FIG. 3.

With the Internet layer of the protocol stack removed, the concept of IP address is relatively meaningless. Because light fixture servers still need an identity, their product ID and serial number may be substituted for IP address in the Transport Layer pseudo-header. In some embodiments, user datagram protocol (UDP) may be employed as the transport layer protocol due to its simplicity relative to transmission control protocol (TCP). For the purposes of this disclosure, a modified IPv4 pseudo-header as described below will be referred to as a modified UDP (MUDP) packet header.

Figure 5:
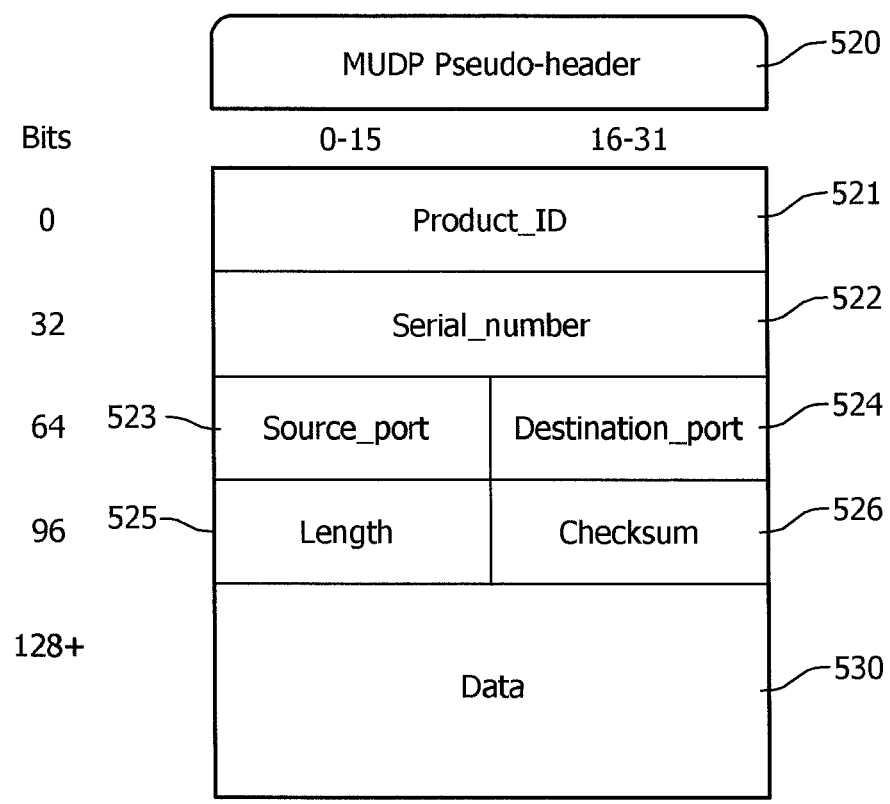
FIG. 5 illustrates an example embodiment of a modified user datagram protocol (UDP) packet which may be employed for communication via a DMX data bus in a DMX network.

FIG. 5 illustrates an example embodiment of a modified user datagram protocol (UDP) packet 500 which may be employed for communication via a DMX data bus in a DMX network.

Modified UDP packet 500 includes a MUDP pseudo-header 520 followed by data (payload data) 530. MUDP pseudo-header 520 includes a product or device identification code 521, a product or device serial number 522, a source_port 523, a destination_port 524, a message length 525, and a checksum 526. Table 3 below describes various fields of an example modified UDP packet 500.

TABLE 3

| | |
|---|---|
| PRODUCT_ID | Defined by the device manufacturer |
| SERIAL_NUMBER | Defined by the device manufacturer |
| SOURCE_PORT | The standard UDP port numbers as defined by the IANA |
| DESTINATION_PORT | The standard UDP port numbers as defined by the IANA |
| LENGTH | The entire length of the user datagram, header and body |
| CHECKSUM | The standard IPv4 checksum |
| DATA | The content of the message |

Figure 6:
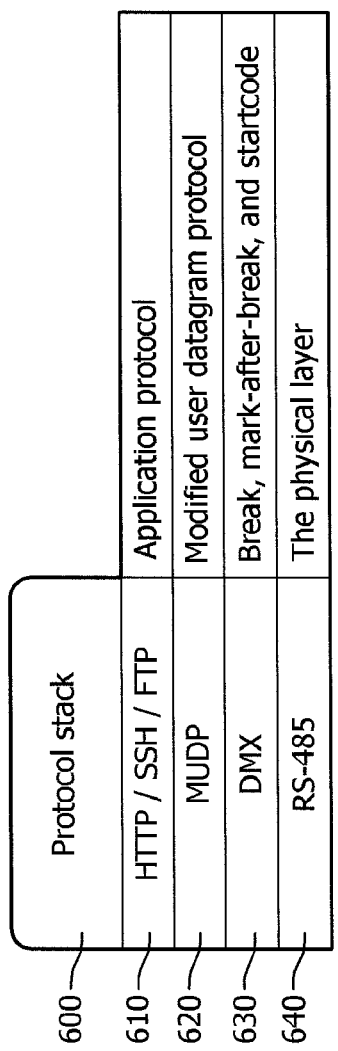
FIG. 6 illustrates an example embodiment of a simplified Internet Protocol stack which may be employed for communicating Internet Protocol messages over a DMX network.

FIG. 6 illustrates an example embodiment of a simplified Internet Protocol stack 600 which may be employed for communicating Internet Protocol messages over a DMX network.

The simplified Internet Protocol stack 600 includes an application layer protocol 610, a modified user datagram protocol 620, DMX protocol 630, and a physical layer protocol 640.

It can be seen from FIG. 6 that the Ethernet data link layer which is generally employed for Internet communications has been replaced by the DMX protocol as a data link layer, which itself rides on an RS-485 standard physical layer.

In some embodiments, the DMX start code for communicating a modified UDP packet may be "0xDE".

An example is now described for illustrating a simple HTTP GET request made by a lighting controller "client" to a lighting fixture "server" with product or device ID 0x00000001and product or device serial number 0x000000FF. In this example the lighting controller is requesting the JSON resource file resource.json using the URL /path/resource.json:

GET /path/resource.json HTTP/1.1

The GET request may be preceded by a modified UDP transport layer header as shown in Table 4, below.

TABLE 4

| | |
|---|---|
| PRODUCT_ID | 0x00000001 |
| SERIAL_NUMBER | 0x000000FF |
| SOURCE_PORT | 1024 |
| DESTINATION_PORT | 80 |
| LENGTH | 48 |
| CHECKSUM | 0xF890 |
| DATA | GET/path/resource.json HTTP/1.1 |

Figure 7:
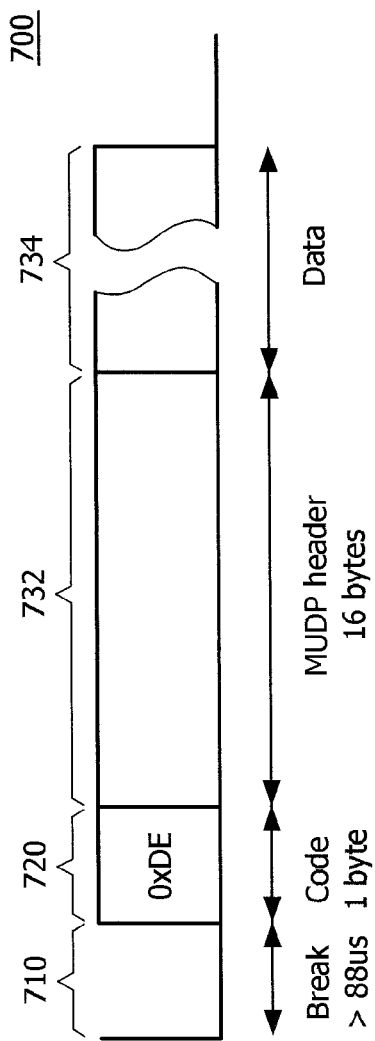
FIG. 7 illustrates an example embodiment of a modified UDP packet or frame which may be transmitted in the DMX network of FIG. 3.

FIG. 7 illustrates an example embodiment of a modified UDP packet or frame 700 which may be transmitted in the DMX network of FIG. 3. Modified UDP frame 700 includes initial frame break 710 followed by DMX start code 720 (e.g., "0xDE") in slot 0, MUDP pseudo-header 732 (see. e.g., element 520 in FIG. 5), and payload data 734. When modified UDP packet or frame 700 is transmitted by a lighting controller (e.g., a "client"), then modified UDP packet or frame 700 may include client data, which may be, for example a request for a specific file, data, or resource. When modified UDP packet or frame 700 is transmitted by a lighting fixture (e.g., a "server"), then modified UDP packet or frame 700 may include server data, which may be, for example, a specific file, data, or resource which may have been requested via a request included in a modified UDP packet or frame 700 previously-received from a client.

Figure 8:
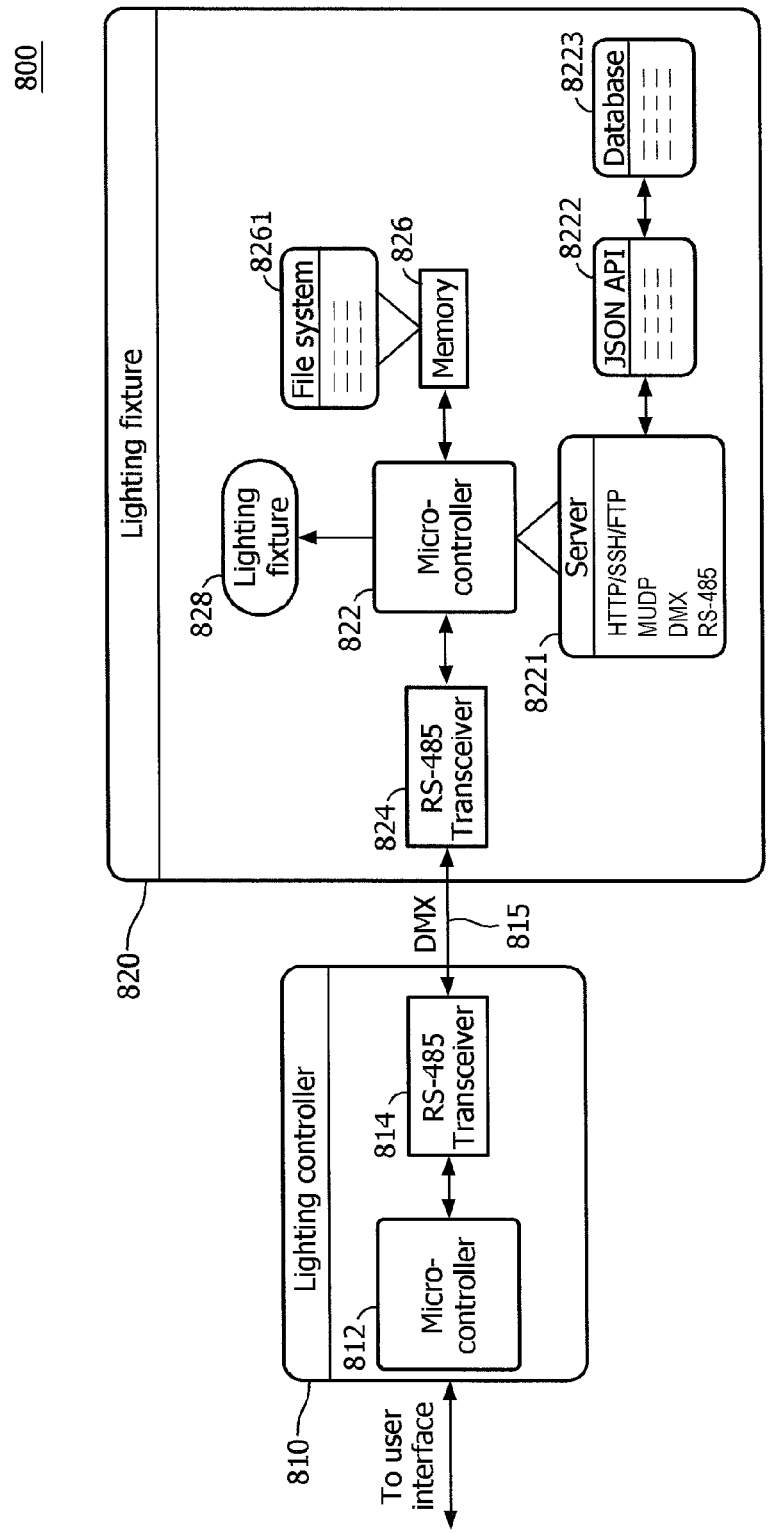
FIG. 8 illustrates an example embodiment of a DMX network including a lighting controller and a lighting fixture with an embedded web server.

FIG. 8 illustrates an example embodiment of a DMX network 800 including a lighting controller 810 and a lighting fixture 820 with an embedded web server, which are connected to, and communicate via a DMX data bus 815.

Lighting controller 810 includes a microcontroller 812 and a communication transceiver 814.

In some embodiments, microcontroller 812 may include a processor and memory. In some embodiments, communication transceiver 814 may be an RS-485 communication transceiver. In some embodiments, lighting controller 810 also may include additional memory, which may include volatile memory such as random access memory (RAM) and/or non-volatile memory such as electrically erasable programmable read only memory (EEPROM) and/or FLASH memory.

Lighting fixture 820 includes a microcontroller 822, a communication transceiver 824, memory 826, and one or ore light sources 828.

Microcontroller 8222 provides one or more servers 8221, an application program interface (API) (e.g., a JSON API) 8222, and a database 8223. In some embodiments, microcontroller 822 may include a processor and memory. Server(s) 8221 have a protocol stack, including an application layer protocol (e.g., HTTP, FTP, SSH, etc.), a transport layer protocol (e.g., MUDP), a data link layer (DMX) and a physical layer (e.g., RS-485).

In some embodiments, communication transceiver 824 may be an RS-485 communication transceiver.

Memory 826 may include volatile memory such as random access memory (RAM) and/or non-volatile memory such as electrically erasable programmable read only memory (EEPROM) and/or FLASH memory. Memory 826 may store therein server data 8261, for example files or resources organized in a file system.

Light sources 828 may include one or more LED-based light sources. In some embodiments, light sources 828 may include at least one red light source (e.g., at least one red LED), at least one green light source (e.g., at least one green LED), and at least one blue light source (e.g., at least one blue LED).

In some embodiments, the intensity (or dimming level), and/or the ON/OFF status, of the red, green, and blue light sources may be individually controllable. In some embodiments, microcontroller 822 may be configured to control the lighting intensity (or dimming level), color, saturation level, color temperature, on/off pattern, etc. of light produced by lighting fixture 820, for example by controlling operating parameters of the red, green, and blue light sources. In some embodiments, microcontroller 822 may be configured to control the lighting intensity (or dimming level), color, saturation level, color temperature, on/off pattern, etc. of light produced by lighting fixture 820 in response to lighting control data received by transceiver 824 via one or more DMX packets received over DMX data bus 815.

In some embodiments, DMX data bus 815 may use an RS-485 differential signal. In some embodiments, DMX data bus 815 may be half-duplex. In some embodiments, DMX data bus 815 may be full-duplex. In some embodiments, DMX data bus 815 may be a one-wire half duplex data bus.

Figure 9:
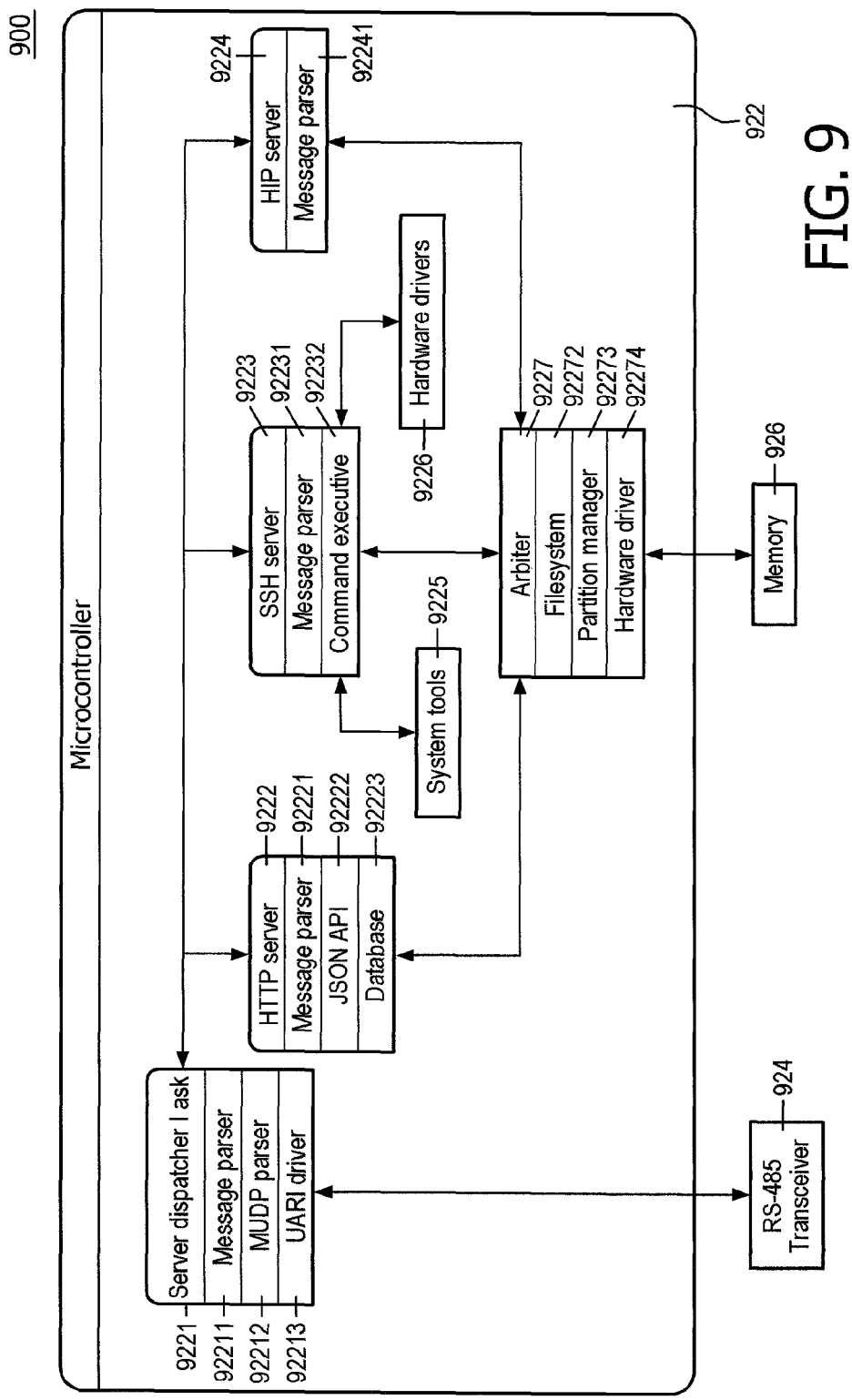
FIG. 9 illustrates an example embodiment of firmware architecture for a lighting fixture including the embedded web server of FIG. 8.

FIG. 9 illustrates an example embodiment of firmware architecture for a lighting fixture 900 including the embedded web server of FIG. 8. Lighting fixture 900 includes microcontroller 922, communication transceiver 924, and memory 926. In some embodiments, communication transceiver 924 may be an RS-485 communication transceiver.

Memory 926 may include volatile memory such as random access memory (RAM) and/or non-volatile memory such as electrically erasable programmable read only memory (EEPROM) and/or FLASH memory. Memory 926 may store therein server data, for example files or resources organized in a file system.

Microcontroller 922 includes a server dispatcher 9221, an HTTP server 9222, an SSH server 9223, an FTP server 9224, system tools 9225, one or more hardware drivers 9226, and a memory controller 9227.

Server dispatcher 9221 includes a message parser 92211, a MUDP parser 92212, and a UART driver 92213 for communicating with transceiver 924.

HTTP server 9222 includes a message parser 92221, a JSON API 92222, and a database 92223.

SSH server 9223 includes a message parser 92231, and a command executive block 92232.

FTP server 9224 includes a message parser 92241.

Memory controller 9227 includes an arbiter 92271, a file system 92272, a partition manager 92273, and a hardware driver 92274 for communicating with memory 926.

FIG. 10 is a flowchart illustrating one example embodiment of a method 1000 of

Internet Protocol communication over a DMX network.

Method 1000 may be conceptualized as two processes 1002 and 1004 which may proceed in series or in parallel with each other in a DMX network. In particular, process 1002 is a process for controlling illumination produced by one or more light sources of a lighting fixture connected in the DMX network. Processor 1004 is a process for Internet Protocol communication between a lighting fixture and a lighting controller connected in the DMX network.

In an operation 1005 of process 1002, a lighting controller transmits lighting control data over a DMX data bus via the lighting controller's transceiver (e.g., an RS-485 transceiver). In some embodiments, lighting control data may be communicated via one or more DMX packets, for example as illustrated in FIG. 4 above, and may be addressed to a specific lighting fixture, or a specific group of lighting fixtures, among a plurality of lighting fixtures which are connected to the DMX data bus.

In an operation 1010 of process 1002, a lighting fixture receives lighting control data included in a DMX packet via a transceiver (e.g., an RS-485 transceiver) of the lighting fixture which is connected to the DMX data bus.

In an operation 1015 of process 1002, a microcontroller of the lighting fixture controls one or more light sources of the lighting fixture according to the lighting control data received in operation 1010.

In an operation 1020 of process 1004, the lighting controller communicates a request using Internet Protocol (e.g., via a modified UDP packet) over the DMX data bus via the lighting controller's transceiver. The request may be a request for a specific file, data, or resource which is stored in memory in a lighting fixture.

In an operation 1025 of process 1004, the lighting fixture receives the request via a transceiver of the lighting fixture (e.g., an RS-485 transceiver) connected to the DMX data bus.

In an operation 1030 of process 1004, the lighting fixture's microcontroller processes the request via an appropriate server for the request (e.g., HTTP, FTP etc.).

In an operation 1035 of process 1004, the lighting fixture's microcontroller processes server data (e.g., a specific file, data, or resource) retrieved from a memory device of the lighting fixture into one or more Internet Protocol packets (e.g., modified UDP packets).

In an operation 1040 of process 1004, the lighting fixture's microcontroller provides the Internet Protocol packets (e.g., modified UDP packets) to the lighting fixture's transceiver.

In an operation 1045 of process 1004, the lighting fixture's transceiver communicates the Internet Protocol packet(s) produced in operation 1035 over the DMX data bus.

Although embodiments described above pertain specifically to a DMX network described above include a lighting controller and lighting fixtures, in general the MUDP packets and communication methods described above can be employed with any DMX network device—for example, audio equipment connected on a DMX data bus.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

Reference numerals appearing between parentheses in the claims, if any, are provided merely for convenience and should not be viewed as limiting the claims in any way.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A device, comprising
a transceiver configured to communicate over a communication network according to Digital MultipleX (DMX) protocol;
a memory device; and
a microcontroller configured to process server data stored in the memory device into one or more Internet Protocol packets and to provide the one or more Internet Protocol packets to the transceiver for communication of the server data over the communication network according to the DMX protocol,
wherein the one or more Internet Protocol packets are interleaved on the communication network with DMX packets which communicate lighting control data from a lighting controller to the device.

2. The device of claim 1, further comprising one or more light sources, wherein the light sources are controlled by the microcontroller in response to lighting control data received by the device over the communication network according to the DMX protocol.

3. The device of claim 1, wherein the transceiver is an RS-485 transceiver.

4. The device of claim 1, wherein the microcontroller is configured to generate a header for each of the Internet Protocol packets, the header including product identification code for device, a serial number for the device, a user datagram protocol (UDP) source port, a UDP destination port, a length of the Internet Protocol packet, a checksum, and the server data.

5. The device of claim 1, wherein the microcontroller is further configured to parse an Internet Protocol packet received by the transceiver from an Internet Protocol client device over the communication network according to the DMX protocol to determine client data included in the Internet Protocol packet.

6. The device of claim 5, wherein the client data is formatted as ASCII text with one byte per ASCII character.

7. The device of claim 5, wherein the client data comprises a request for the server data, the request complying with one of a JSON data interchange format and an XML data interchange format.

8. The device of claim 1, wherein the microcontroller is configured to provide at least one of an HTTP server, an FTP server, and an SSH server, and to communicate via the transceiver with a client connected to the communication network, according to the DMX protocol.

9. A method, comprising:
a microcontroller processing server data retrieved from a memory device into one or more Internet Protocol packets;
providing the one or more Internet Protocol packets to a transceiver; and
communicating the one or more Internet Protocol packets from the transceiver over a communication network according to Digital MultipleX (DMX) protocol
wherein the one or more Internet Protocol packets are interleaved on the communication network with DMX packets which communicate lighting control data from a lighting controller.

10. The method of claim 9, further comprising:
the microcontroller receiving from the transceiver lighting control data communicated over the communication network according to the DMX protocol; and
controlling illumination of one or more light sources according to the lighting control data.

11. The method of claim 9, further comprising the microcontroller generating a header for each of the Internet Protocol packets, the header including a product identification code for a device which includes the microcontroller, a serial number for the device which includes the microcontroller, a UDP source port, a UDP destination port, a length of the Internet Protocol packet, a checksum, and the server data.

12. The method of claim 9, further comprising the microcontroller parsing an Internet Protocol packet received by the transceiver from an Internet Protocol client device over the communication network according to the DMX protocol to determine client data included in the Internet Protocol packet.

13. The method of claim 12, wherein the client data is formatted as ASCII text with one byte per ASCII character.

14. The method of claim 12, wherein the client data comprises a request for the server data, the request complying with one of a JSON data interchange format and an XML data interchange format.

15. The method of claim 9, further comprising the microcontroller providing at least one of an HTTP server, an FTP server, and an SSH server, and communicating via the transceiver with a client connected to the communication network, according to the DMX protocol.

16. A network, comprising:
a Digital MultipleX (DMX) data bus;
a lighting controller connected to the DMX data bus; and
at least one lighting fixture connected to the DMX bus, wherein the lighting fixture comprises:
a transceiver configured to communicate over the DMX bus;
one or more light sources,
a memory device, and
a microcontroller configured to control illumination by the one or more light sources in response to lighting control data received from the lighting controller over the DMX data bus, and further configured to process server data stored in the memory device into one or more Internet Protocol packets and to provide the one or more Internet Protocol packets to the transceiver for communication of the server data to the lighting controller over the DMX data bus,
wherein the lighting controller comprises:
a lighting controller transceiver configured to communicate over the DMX bus; and
a microcontroller configured to provide one or more Internet Protocol packets to the lighting controller for communication to the at least one lighting fixture over the DMX data bus.

17. The network of claim 16, wherein the transceiver is an RS-485 transceiver.

18. The network of claim 16, wherein the microcontroller is configured to generate a header for each of the Internet Protocol packets, the header including a product identification code for the lighting fixture, a serial number for the lighting fixture, a UDP source port, a UDP destination port, a length of the Internet Protocol packet, a checksum, and the server data.

* * * * *